Nov. 10, 1970     W. POTOROKA, SR     3,540,023
FISHERMAN'S WATER TEMPERATURE LOCATING APPARATUS
Filed Feb. 13, 1967
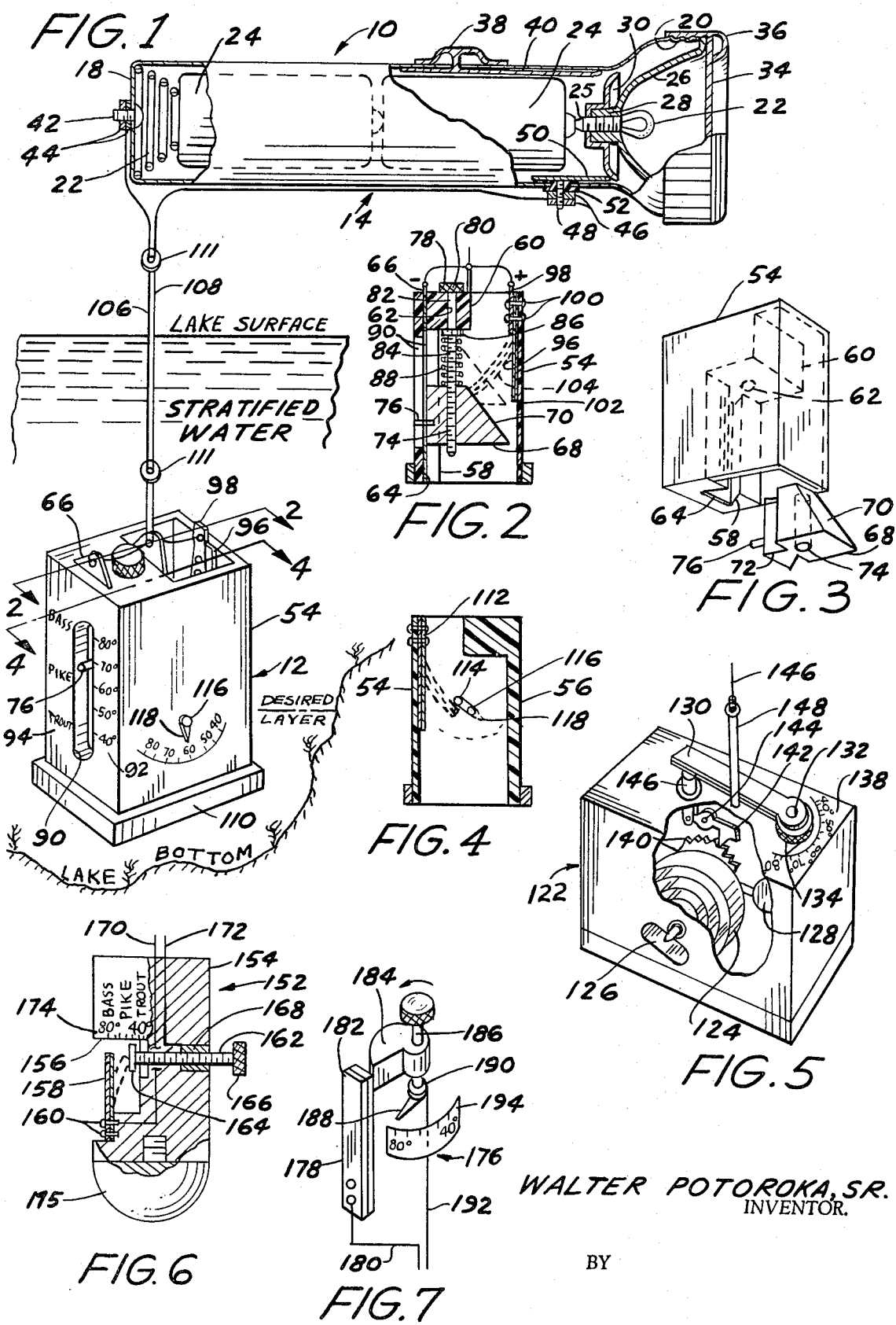
WALTER POTOROKA, SR.
INVENTOR.
BY

United States Patent Office 3,540,023
Patented Nov. 10, 1970

3,540,023
FISHERMAN'S WATER TEMPERATURE LOCATING APPARATUS
Walter Potoroka, Sr., Rochester, Mich.
(3505 Adams Road, Lake Orion, Mich. 48035)
Filed Feb. 13, 1967, Ser. No. 615,829
Int. Cl. A01k *97/12;* G08b *21/00;* G12b *1/02*
U.S. Cl. 340—227.1                                 10 Claims

ABSTRACT OF THE DISCLOSURE

This application discloses inexpensive apparatus, the operation of which is based on published scientific evidence that each species of game fish is found most frequently at a particular temperature or temperature range, that includes an element that can be set for a desired temperature (species) and lowered into thermally stratified water until the desired temperature is reached, at which time a signal will be automatically produced, the signal portion of the preferred electrical embodiment of the apparatus comprising an ordinary flashlight simply modified for such use but still usable for its original purpose and other purposes.

BRIEF SUMMARY OF THE INVENTION

The invention will be best understood by reference to the following published materials: (1) How to Find Fish in Summer, Outdoor Life, July 1966, by Wynn Davis; (2) Fisherman's Encyclopedia, edited by Dr. Ira N. Gabrielson; (3) Thermal Stratification in Reservoirs by F. W. Kittrell (presented at the Symposium on Streamflow Regulation for Quality Control Apr. 3–5, 1963, Robert A. Taft Sanitary Engineering Center, Cleveland, Ohio).

Davis points out the problems of a summertime fisherman, gives some of the reasons for these problems, including a discussion of the thermocline, and makes suggestions for overcoming these problems. The Kittrell report presents scientific evidence of the thermal stratification referred to by Davis, and the Fisherman's Encyclopedia, in addition to verifying the Davis article, states some of the specific preferred water temperatures for the various species of game fish.

In summary, it can be stated that the summertime fisherman is at a definite disadvantage and increases his chances of catching a particular species of fish, particularly in lakes subject to thermal stratification, by fishing where the preferred temperature level for that particular species, regardless of depth, intersects the lake bottom, where the food and cover are found.

Fishermen's thermometers are already available, but they are either too expensive or have certain disadvantages. Ideally, the fisherman should know what temperature he is seeking and be able to find the desired temperature the first time he lowers the temperature responsive device into the water. The electronic water thermometer shown in the article by Davis has this capability, but it is too expensive for most fishermen. The maximum-minimum thermometer mentioned in the Fishermen's Encyclopedia is somewhat less expensive, but it has the disadvantage that it must be raised to the surface for reading; that is, it must be lowered and raised a number of times in order to locate the desired temperature. The same disadvantage is characteristic of other less expensive fishermen's thermometers that are available.

For example, the instructions for one relatively inexpensive fisherman's thermometer read, "(1) Attach to line; let sink to bottom or desired depth. (2) Hold at bottom or desired depth for 30 seconds; return to surface. (3) Read depth at top of water column; temperature off temp. plate. (4) Invert instrument; press valve to release water. Shake all water out." These instructions also include the Temperature Preference Ranges for most game fish. However, there is at least one disadvantage to this device, that being that the instrument must be raised to the surface to observe the temperature. Otherwise, there is no way of knowing what the temperature is.

Accordingly, a main object of this invention is to provide an inexpensive fisherman's thermometer apparatus that may be set for the desired temperature before it is lowered into the water and that will give an electrical or mechanical signal on the first lowering of the device when the desired temperature is first reached, the device having sufficient weight so that it can then be moved about the lake, without raising the same, until its engagement with the lake bottom is felt.

Another object of the invention is to provide such apparatus wherein the temperature sensing element is a bi-metallic element.

Another object of the invention is to provide such apparatus operating on an electrical principle.

Another object of the invention is to provide such apparatus wherein the desired temperature signal is a lamp.

Still another object of the invention is to provide such apparatus wherein the desired temperature signal portion may be an ordinary flashlight, which fisherman should have available in any event, modified for use as part of the apparatus, and for other practical uses, but still capable of its original use as a flashlight, either separate from or attached to said apparatus.

A still further object of the invention is to provide such apparatus wherein the desired temperature signal is mechanical, rather than electrical.

Another object of the invention is to provid such apparatus wherein the temperature sensing portion is sufficiently weighted to serve as a lake bottom finding device.

Another object of the invention is to provide such apparatus wherein the temperature sensing element is enclosed to protect the same from damage, the enclosure having an opening therein to enable the free flow of water therethrough for continuous contact with the temperature sensing element.

Another object of the invention is to provide such apparatus wherein the desired temperature setting device is permanently marked with a temperature scale and/or a fish species preferred temperature scale so that such necessary information is always at hand.

Still another object of the invention is to provide such apparatus having independent means for determining the temperature at any depth to which the temperature responsive was lowered, thereby making the apparatus better suited for purposes such as determining thermocline depths.

These and other objects and advantages of the invention will become more apparent upon reference to the detailed description below and the attached drawings.

BRIEF DESCRIPTION OF THE SEVERAL VIEWS OF THE DRAWINGS

FIG. 1 is a schematic illustration of the preferred embodiment of a complete apparatus embodying the invention, the flashlight signal portion being shown in cross section and the temperature responsive portion to be lowered into the water being shown in perspective;

FIG. 2 is a cross sectional view taken on the plane of line 2—2 of FIG. 1 and looking in the direction of the arrows;

FIG. 3 is an exploded perspective view of two elements of the temperature sensitive element shown in FIG. 1;

FIG. 4 is a cross sectional view taken on the plane of line 4—4 of FIG. 1 and looking in the direction of the arrows;

FIG. 5 is a perspective view of a modification of the invention wherein the desired temperature signal is produced by mechanical, rather than electrical, means;

FIG. 6 is a view, with portions thereof cut away and in cross section, illustrating a somewhat simpler modification of the temperature responsive portion of the invention shown in FIGS. 1-4;

FIG. 7 is a perspective view of another possible arrangement of the temperature sensing portion.

DETAILED DESCRIPTION

Referring now to the drawings in greater detail, and particularly to FIGS. 1-4, the apparatus 10 includes, in its preferred embodiment, a temperature sensing portion or assembly 12 and a signal portion or assembly 14.

Since it is a common device well suited, with but slight modification, for the purposes of the invention, the signal portion of device 14, which is an ordinary flashlight, will be discussed very briefly.

A common flashlight 14 includes a hollow cylindrical metal body or housing 16 having a closed end 18 and a flared open end formed with threads 20. The housing contains a metal spring 22, and it is usually loaded with two batteries 24. A non-conductive or insulating reflector 26 is inserted into the open end of the body, the reduced diameter portion 28 of the reflector being fitted with an annular stationary metal contact or switch element 30 into which the metal base of the lamp 32 is threaded. A lens 34 and a threaded cap 36 are then fitted on the open end of the body 16. The body is provided with a movable metal switch element 38 that includes a movable contact 40 for engaging stationary contact 30, at which time a circuit is completed within the housing 16 to energize the lamp 32. The flashlight 14 is shown in the open circuit position in FIG. 1, movable contact 40 being out of engagement with stationary contact 30.

The details of construction of other well-known flashlights may vary, but the principle of operation is the same. With the contact 40 in the open or off position shown, other means may be provided to close a circuit and energize the lamp 32, adapting the flashlight for other often needed uses, such as for testing low voltage circuits or as a low voltage power supply, or use as the signal portion 14 of the invention. The reader undoubtedly can recall many instances where he was in need of a low voltage power source to conduct some kind of a test or experiment and had to make one up. The modified flashlight proposed herein provides just such a handy device.

A suitable modification for this purpose may be to provide a first terminal comprising means such as a screw 42 and two nuts 44 at the closed end of the body 16 and a second similar terminal near the lamp end of the body, the second terminal comprising two nuts 46 on a screw 48 having a contact 50 continuously in engagement with stationary contact 30, the contact 50 and screw 48 being insulated from the body 16 by a non-conducting rubber or other grommet 52. With the switch 38 in the off or open circuit position, the lamp 32 will not light due to the insulator 52, unless the circuit including terminals 42 and 48 are connected by some other switch means. Thus, in the condition described, the flashlight 14 may be used for its originally intended purpose, or it may be used for these other purposes. Obviously, simpler, quick-connect type terminals could be substituted for terminals 42 and 48, and the modification could be made in other equivalent ways.

It is also obvious that some other equivalent signal device could be provided. However, flashlights are already available for this simple modification, and a fisherman should always have a flashlight among his items of equipment, for obvious reasons including emergencies. If he does not already have one, the invention will provide one, or it will provide a spare one.

The temperature responsive or sensing portion 12 of the apparatus 10 may, of course, be constructed in a number of ways. In the preferred embodiment shown, the device 12 is constructed around a hollow injection molded plastic or other non-conducting body 54 formed essentially in a manner shown in perspective by FIG. 3, with one thicker wall 56 having a wedge groove 58 formed therein, the groove extending to a stepped portion or abutment 60 having an unthreaded passage 62 formed therein. A strip of metal or other conducting material 64 is secured at the base of the groove 58, one end 66 of the strip extending beyond the top end of the body 54.

Another main element of the device 12 is the metallic or other conducting block 68 having a sloped side 70, a wedge projection 72 fitting and slidable in the wedge groove 58, a threaded passage 74 formed therein and an indicator or pointer 76 extending from the side thereof opposite the sloped side 70. Alternatively, the block 68 may be of plastic material, with conducting surfaces molded therein.

A plastic or other non-conducting bolt or screw 78 having a knurled head 80, an unthreaded portion 82 and a threaded end portion 84 is disposed in the unthreaded passage 62 so that it may be rotated freely, the bolt being retained axially by flange means 86. The threaded end 84 of the screw is disposed in the threaded passage 74 in the block 68, with a coil spring 88 between the portion 60 and the block 68. Thus, rotation of the screw causes the block 68 to be moved along the groove 58 in a direction dependent upon the direction of rotation of the screw.

The pointer 76 is disposed in a groove 90 formed in the strip 64 and the bottom of groove 58, the outer surface of body 54 on one side 92 of the groove being conveniently molded or otherwise permanently marked with indicia of temperature and on the other side 94 thereof with indicia of preferred temperatures for specific fish species so that such necessary information is always at hand. It will be apparent, then, that the pointer 76, and the block 68, can be set to any specific desired temperature (species).

A temperature responsive bimetallic strip 96 and a terminal 98 are secured by any suitable means, such as rivets 100, to the inner wall of the body 54, opposite the sloped side 70 of the block 68. The strip 96 may be selected so that at the highest expected summertime ambient temperature the free end of the strip is disposed substantially adjacent the wall 102, the strip moving towards the dotted line position 104 as temperature drops upon lowering thereof into a stratified lake.

It can now be seen that the slope 70, a bimetallic strip 96 and a thread pitch of screw 78 can be selected such that the free end of the strip 96 repeatedly engages the block 68 precisely at the temperature to which the pointer 76 is set, providing an electrically conductive path from the terminal 98, through the strip 96 and block 68 and then to the end 66 of the conductor strip 64.

If lead wires 106 and 108 of suitable length are connected between terminals 42 and 66 and terminals 48 and 98, respectively, the pointer 76 is set to some temperature, 70° for example, and device 12 is lowered into a stratified body of water during the summertime, the temperature will drop and the bimetal 96 will distort unit at 70° it engages the sloped surface 70, at which time a circuit will have been completed and lamp 32 will be energized, indicating that the desired temperature, 70°, has been reached. It should be noted that plastic body 54 has a passage therethrough so that the bimetallic strip 96 is always in contact with changing water temperature, with the strip 96 being at all times protected from damage.

Having found the desired temperature (species) layer, the fisherman can then slowly move his boat until the device 12 engages the lake bottom and fish the bottom in that area. Preferably, a steel or other weight 110 is added to enable penetration of weed beds and facilitate accurately locating the lake bottom. Spaced markers 111 or other means may be employed to mark off distances along the leads 106–108, if it is desired to determine the depth at which the desired temperature exists. However, the fisherman is normally seeking a temperature, rather than a depth.

At a minimum of additional cost, a second bimetallic element 112 may be secured within the body 54 in a position for the free end thereof to reposition a lever 114 pivoted on a pin 116 extending through the wall of body 54 and having a pointer 118 traversing a temperature scale 120. That is, before the device 12 is lowered into the water, the pointer 118 is set to the higher end of the scale; as the device 12 is lowered, the pointer is moved by the element 112 to and left at the lowest temperature reached, which temperature and the depth can be read when the device 12 is raised to the surface.

While the device 12 is shown as a square or rectangular tube structure, it may, of course, be made in any shape, such as cylindrical, and the structural details may be varied considerably without departing from the principle of operation thereof. Furthermore, the apparatus 10 need not be electrical.

The device 122 shown by FIG. 5 can also be set to a particular temperature and will provide a signal to the fisherman when the desired temperature is reached. However, the operation and the signal are not electrical; rather, they are mechanical, and device 122 is complete itself. Device 122 is shown as a hollow, box-like structure containing a spring-driven motor 124 wound by a sealed key 126 and driving an eccentric weight 128.

A bimetallic element 130 is mounted on an axially adjustable pin 132, adjustment being provided by means of a screw 134 having a pointer 136 traversing a temperature and/or a species scale 138. The motor 124 may be retained in the wound condition by a ratchet 140 and pawl 142, the later being pivotted on fixed pin 144 and pivotally connected to the sealed trigger 146.

By adjustment of the nut 134, the bimetallic element 130 can be made to depress trigger 146 at the temperature to which the pointer 134 is set and release the pawl 142. As the motor unwinds, the weight 128 will be rotated, resulting in a wobbling motion, much like that of hooked fish, of the device 122 felt in the line 146 attached to the stem 148. The device may require a weight 150 to intensify the signal and assist in locating the lake bottom.

Other mechanical devices are, of course, possible, the important requirements being that the device can be preset to a desired temperature and capable of providing a pull on the line or some other signal when the desired temperature has been reached so that the device need not be raised to observe the temperature. For example, known temperature responsive devices capable of applying a greater force than a bimetallic element may be combined with a spring and made to trip a weight, resulting in a substantial mechanical signal.

FIG. 6 illustrates a somewhat simpler version 152 of the temperature sensor 12 shown by FIG. 1. The body 154 may be cylindrical or rectangular and formed of molded plastic, with a recess 156 on one side thereof. A bimetallic element 158 is secured at one end to the body 154, as by screws or rivet 160, so that it moves to the dotted line position as temperature decreases. A metal screw 162 having a metal contact 164 and a knurled head 166 is received in a threaded passage including a metallic element 168. Lead wires 170 and 172, corresponding to lead wires 106 and 108, are secured to rivet 160 and element 168, respectively, and they extend beyond the body 154 for connection to the signal device 14. A temperature and/or species scale 174 is marked on the body, the device being set before lowering into the water by positioning the contact 164 at the desired temperature and the operation being similar to that of device 12 of FIG. 1. A weight 175 may be screwed into the bottom of the body 154.

FIG. 7 merely illustrates another possible arrangement of the conducting elements of a modified temperature sensing device 176, it being understood that these elements would be suitably mounted in a supporting structure. The bimetallic element 178 has a lead 180, and the free end 182 thereof moves toward the metal cam 184 mounted to rotate with the metal shaft 186 having a pointer 188 and mounted in a metal sleeve 190 to which a lead 192 is connected. The cam is contoured so that the temperature at which it is contacted by the bimetallic element corresponds to the position of the pointer 188 on the temperature and/or species scale 194, the device being connected to a signal device such as device 14 and operating in a manner similar to device 12.

It should be apparent from the above description that there has been provided novel, simple and inexpensive means for accurately locating, with certainty, desired temperature layers in a stratified body of water, without having to raise the device to observe the temperature sensing device itself and making several attempts to locate the desired temperature. The device can be either electrical or mechanical, and it can be provided with additional means for indicating the minimum temperature to which the device has been lowered. The device produces a signal only when and as soon as the desired temperature is located, the signal being of a character such as to be perceptible to the fisherman without observing a continuously reading temperature scale, such as in a temperature calibrated electric meter, which is expensive and requires careful handling, and without raising any part of the device to read a thermometer. In fact, in the embodiments shown, the signal is perceptible even in darkness, as for night fishing. Further, an electric signal device has been provided by simply modifying an ordinary flashlight, the modified flashlight also having other practical uses.

It will be understood that the main feature of the flashlight modifications is the provision of an additional circuit portion including a pair of terminals accessible for connection to an external circuit portion, it being possible to arrange the additional circuit so that the lamp may be excluded, if so desired, as when the flashlight is used not as a circuit tester but merely as a convenient power source package and the lamp is not required or desired. For example, with the modification shown in FIG. 1, a simple conducting screw member could be substituted for the lamp screw base 25 to provide a direct connection between the contact 30 and the adjacent battery, but other arrangements are possible, perhaps even by redesign of the switch member 38. Obviously, terminal 48 should be constructed and arranged so that the additional circuit portion cannot itself be closed by an accidental connection between the housing 16 and the terminal 48, as might occur if the flashlight were resting on a conducting surface with terminal 48 touching the same.

A preferred embodiment and three modifications of the invention have been shown and described in such clear and concise terms as to enable anyone skilled in the art to practice the same.

What I claim as my invention is:

1. A device for locating a particular layer of water of desired temperature in a thermally stratified fishing lake, said device comprising body means lowerable from the surface of said lake toward the bottom of said lake through the thermally stratified water of said lake, temperature responsive electrical switching means carried by said body means, said electrical switching means being directly exposed to said water of said lake in order to be quickly acted upon and responsive to the thermally stratified water of said lake, said switching means comprising first and second switch members respectively connected to first and second electrical conductor means, at least said first switch member being thermally responsive and movable so as to move toward said second switch member in response to decreasing temperature so as to close the electrical circuit between said first and second electrical conductor means upon contacting said second switch member, adjusting means carried by said body means so as to be lowerable through said water of said lake as said body means and temperature responsive electrical switching means are lowered from said surface toward said bottom of said lake, said adjusting means being effective for adjusting said first and second switch members relative to each other so as to normally cause said first and second switch members to be electrically open with respect to each other as said body means and electrical switching means are first lowered through said surface of said lake, said adjusting means also being effective to adjust said first and second switch members relative to each other so as to preselect said desired temperature thereby permitting said first and second switch members to experience relative movement toward each other as said body means is progressively lowered through progressively cooler layers of water of said thermally stratified lake and to cause said first and second switch members to contact each other only when said body means and switch members have been lowered to said particular layer of water of said preselected desired temperature thereby completing said electrical circuit, said first and second electrical conductor means adapted for connection to a source of electrical potential, and sensory signal producing means operatively connected in circuit with said first and second electrical conductor means, said signal producing means being effective to automatically produce a sensory signal when said circuit through said first and second electrical conductors is completed by said first and second switch members in order to indicate that said switch members have been lowered to said particular layer of water of desired temperature.

2. A device such as that recited in claim 1, wherein said body means is maintained substantially vertically disposed with respect to its point of entrance through said surface of said lake regardless of lateral water currents within said lake, said weighted body means also being sufficiently weighted as to be effective for abuttingly engaging with relatively high impact raising contours of said bottom of said lake existing at a level corresponding to said particular layer of water or desired temperature and thereby transmit a shock type of signal through associated means for lowering said body means.

3. A device such as that recited in claim 1, wherein said second switch member comprises a stationary electrical contact, wherein said adjusting means is effective to adjustably reposition said stationary electrical contact from one selected stationary position to any of other selected stationary positions, and wherein said source of electricity comprises an electrical battery power supply.

4. A device such as that recited in claim 3, wherein said sensory signal producing means comprises a flashlight assembly including said battery power supply and an electrically energizable lamp, said flashlight assembly having an on-off switch and a pair of electrical terminals having a continuous electrically conductive path therebetween excluding said on-off switch but including said battery power supply and said lamp, said terminals being connected to said first and second switch members by means of said first and second electrical conductor means, said electrical conductor means being of sufficient length to lower said body means to said bottom of said lake while said flashlight assembly remains above said surface of said lake.

5. A device such as that recited in claim 3, wherein said first switch member comprises a bimetallic element constructed and arranged so as to move toward said second switch member as temperature decreases.

6. A device such as that recited in claim 1, wherein said adjusting means includes an indicator element traversing a water resistant scale having indicia of spaced graduations for indicating the particular layer of water of desired temperature selected by said adjusting means.

7. A device such as that recited in claim 1, wherein additional resettable fish preferred temperature responsive means is provided, said additional means being operative to record the lowest temperature to which said device was subjected upon its being lowered toward the lake bottom.

8. A device according to claim 1, wherein said body means comprises a housing opened so as to permit the flow of said water of said lake therethrough, wherein said second electrical switch member is normally stationary with respect to said housing but adjustably positionable to any of a number of selected stationary positions, and wherein said first electrical switch member comprises a bimetallic element carried by said housing so as to be directly exposed to said water, said bimetallic element being effective to move toward said second electrical switch member as the temperature of said water decreases.

9. A device according to claim 1, wherein said body means comprises a housing opened so as to permit the flow of said water of said lake therethrough, wherein said second electrical switch member comprises a cam member having a contoured cam surface adjustably positionable to any of a number of selected positions, and wherein said first electrical switch member comprises a bimetallic element carried by said housing so as to be directly exposed to said water, said bimetallic element being effective to move toward said contoured cam surface as the temperature of said water decreases.

10. A device according to claim 9, wherein said housing carries guide ways, wherein said cam member carries guide means adapted for slideable coaction with said guide ways so as to enable slideable motion of said cam member relative to said housing, and wherein said adjusting means includes a portion extending without said housing for slideably adjusting said cam member along said guide ways.

References Cited
UNITED STATES PATENTS

| | | | |
|---|---|---|---|
| 1,390,532 | 9/1921 | Ludeman | 340—227.1 |
| 1,795,507 | 3/1931 | Riccio | 340—227.1 |
| 3,007,110 | 10/1961 | Rosenstrach | 324—53 |
| 3,031,788 | 5/1962 | Shannon | 43—4 |
| 3,145,337 | 8/1964 | Lipson | 324—53 |
| 3,171,109 | 2/1965 | Appel | 340—227.1 |
| 2,741,099 | 4/1956 | Beane | 340—227.1 |
| 3,391,402 | 7/1968 | Lucas et al. | 340—227.1 |

DONALD J. YUSKO, Primary Examiner

P. PALAN, Assistant Examiner

U.S. Cl. X.R.

43—4, 17; 340—283